United States Patent [19]
Spriggle

[11] Patent Number: 5,844,324
[45] Date of Patent: Dec. 1, 1998

[54] WIND TURBINE GENERATOR FOR RECREATIONAL VEHICLES

[76] Inventor: Wayne D. Spriggle, 3245 Laurel Rd., Longview, Wash. 98632

[21] Appl. No.: 910,522

[22] Filed: Aug. 7, 1997

[51] Int. Cl.⁶ ...................................................... B60L 8/00
[52] U.S. Cl. .............................. 290/55; 290/44; 415/4.2; 180/65.2
[58] Field of Search ................... 290/43, 44, 54, 290/55; 415/4.2, 4.3, 4.4; 180/65.2, 65.3

[56] References Cited

U.S. PATENT DOCUMENTS

| | | | |
|---|---|---|---|
| 3,513,326 | 5/1970 | Potts | 290/55 |
| 3,621,930 | 11/1971 | Dutchak | 180/65 R |
| 3,876,925 | 4/1975 | Stoeckert | 322/1 |
| 4,179,007 | 12/1979 | Howe | 180/65 DD |
| 4,314,160 | 2/1982 | Boodman et al. | 290/55 |
| 4,423,368 | 12/1983 | Bussiere | 322/35 |
| 5,280,827 | 1/1994 | Taylor et al. | 180/165 |
| 5,287,004 | 2/1994 | Finley | 290/55 |

*Primary Examiner*—Nestor Ramirez
*Assistant Examiner*—Nicholas Ponomarenko

[57] ABSTRACT

A wind powered electrical generator for a recreational vehicle comprising a mounting assembly including a vertical rod removably coupled to the recreational vehicle. A horizontally oriented stator is provided including a torroid fixedly coupled at a top end of the vertical rod with a coil wrapped about the torroid. A turbine is provided including a frusto conical inner shell, a frusto conical outer shell, and a plurality of turbine vanes coupled therebetween. Next included is a rotor having a plurality of magnets fixedly coupled to the turbine and rotatably coupled to the stator for inducing a current within the coil upon the rotation thereof. A wire has a first end connected to the coil and a second end strung through the mounting assembly and terminating in a plug for coupling with the recreational vehicle for recharging batteries thereof.

6 Claims, 2 Drawing Sheets

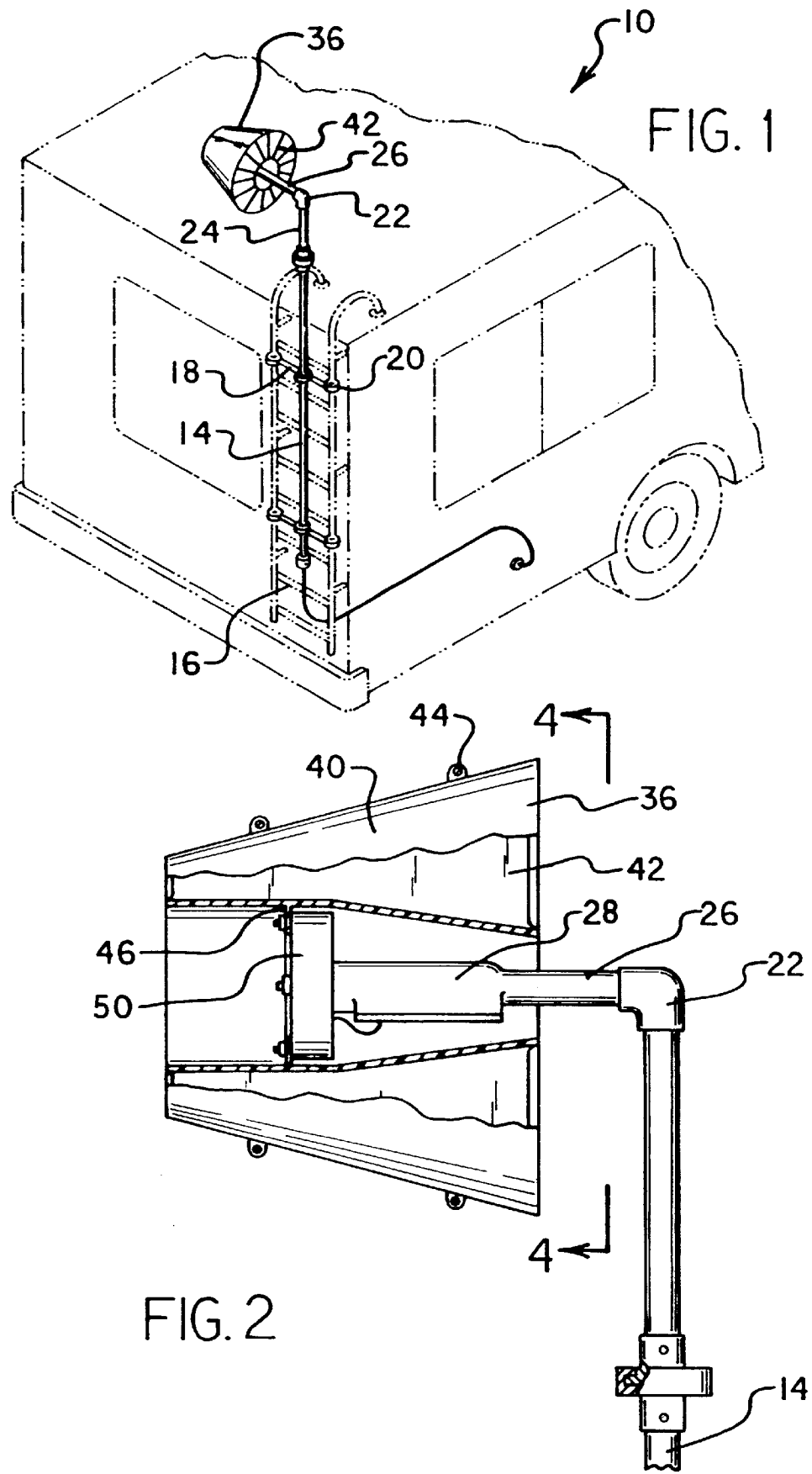

WIND TURBINE GENERATOR FOR RECREATIONAL VEHICLES

BACKGROUND OF THE INVENTION

1. Field of the Invention

The present invention relates to wind generators and more particularly pertains to a new wind turbine generator for recreational vehicles for exploiting wind to recharge the batteries of a recreational vehicle when stationary.

2. Description of the Prior Art

The use of wind generators is known in the prior art. More specifically, wind generators heretofore devised and utilized are known to consist basically of familiar, expected and obvious structural configurations, notwithstanding the myriad of designs encompassed by the crowded prior art which have been developed for the fulfillment of countless objectives and requirements.

Known prior art wind generators include U. S. Pat. No. 5,391,926; U.S. Pat. No. 5,133,637; U.S. Pat. No. 4,414,477; U.S. Pat. No. 5,315,159; U.S. Pat. No. 5,252,029; and U.S. Pat. Des. 267,951.

In these respects, the wind turbine generator for recreational vehicles according to the present invention substantially departs from the conventional concepts and designs of the prior art, and in so doing provides an apparatus primarily developed for the purpose of exploiting wind to recharge the batteries of a recreational vehicle when stationary.

SUMMARY OF THE INVENTION

In view of the foregoing disadvantages inherent in the known types of wind generators now present in the prior art, the present invention provides a new wind turbine generator for recreational vehicles construction wherein the same can be utilized for exploiting wind to recharge the batteries of a recreational vehicle when stationary.

The general purpose of the present invention, which will be described subsequently in greater detail, is to provide a new wind turbine generator for recreational vehicles apparatus and method which has many of the advantages of the wind generators mentioned heretofore and many novel features that result in a new wind turbine generator for recreational vehicles which is not anticipated, rendered obvious, suggested, or even implied by any of the prior art wind generators, either alone or in any combination thereof.

To attain this, the present invention generally comprises a hollow vertical linear rod removably coupled to a ladder of the recreational vehicle. Note FIG. 1. The mounting assembly further includes an L-shaped rotator mount with a vertical portion having a bottom end rotatably coupled to the linear rod in collinear relationship therewith. The L-shaped rotator mount further includes a horizontal extent extending above a roof of the recreational vehicle and having a hollow cylindrical chamber formed thereon in concentric relationship therewith. As shown in FIG. 2, a stator is provided including a torroid fixedly coupled about the end of the hollow cylindrical chamber. A coil is wrapped about the torroid. Next provided is a turbine including a frusto conical inner shell and a frusto conical outer shell. A plurality of turbine vanes are coupled between inner surfaces of the shells. The frusto conical inner shell is further equipped with an annular flange integrally coupled to an inner surface thereof adjacent an end of the outer shell having a smaller diameter. As shown in both FIGS. 2 & 3, the annular flange extends radially inwardly within the interior surface of the inner shell. With reference still to FIG. 3, a rotor is shown to include a circular plate fixedly coupled to the annular flange with a peripheral lip integrally coupled to a periphery of the circular plate. The peripheral lip extends away from the end of the outer shell having a smaller diameter to define an open face and an interior space. The peripheral lip of the rotor has a plurality of magnets coupled to an inner surface thereof. The rotor further has an axle with a first end fixedly and coaxially coupled to the circular plate and a second end rotatably mounted within the hollow cylindrical chamber of the mounting assembly via a pair of bearing assemblies. By this structure, the peripheral lip and associated magnets are rotatable about the stator for inducing a current within the coil upon the rotation thereof. Mounted within the hollow cylindrical chamber of the mounting assembly is a regulator. Such regulator is connected to the coil for transmitting power received from the coil and further limiting said power. A wire is provided having a first end connected to the regulator and a second end strung through the mounting assembly. As shown in FIG. 1, the wire terminates in a plug for coupling with the recreational vehicle for recharging batteries thereof.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new wind turbine generator for recreational vehicles apparatus and method which has many of the advantages of the wind generators mentioned heretofore and many novel features that result in a new wind turbine generator for recreational vehicles which is not anticipated, rendered obvious, suggested, or even implied by any of the prior art wind generators, either alone or in any combination thereof.

It is another object of the present invention to provide a new wind turbine generator for recreational vehicles which may be easily and efficiently manufactured and marketed.

It is a further object of the present invention to provide a new wind turbine generator for recreational vehicles which is of a durable and reliable construction.

An even further object of the present invention is to provide a new wind turbine generator for recreational vehicles which is susceptible of a low cost of manufacture with regard to both materials and labor, and which accordingly is then susceptible of low prices of sale to the consuming public, thereby making such wind turbine generator for recreational vehicles economically available to the buying public.

Still yet another object of the present invention is to provide a new wind turbine generator for recreational vehicles which provides in the apparatuses and methods of the prior art some of the advantages thereof, while simultaneously overcoming some of the disadvantages normally associated therewith.

Still another object of the present invention is to provide a new wind turbine generator for recreational vehicles for exploiting wind to recharge the batteries of a recreational vehicle when stationary.

Even still another object of the present invention is to provide a new wind turbine generator for recreational vehicles that includes a vertical rod removably coupled to the recreational vehicle. A horizontally oriented stator is provided including a torroid fixedly coupled at a top end of the vertical rod with a coil wrapped about the torroid. A turbine is provided including a frusto conical inner shell, a frusto conical outer shell, and a plurality of turbine vanes coupled therebetween. Next included is a rotor having a plurality of magnets fixedly coupled to the turbine and rotatably coupled to the stator for inducing a current within the coil upon the rotation thereof. A wire has a first end connected to the coil and a second end strung through the mounting assembly and terminating in a plug for coupling with the recreational vehicle for recharging batteries thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new wind turbine generator for recreational vehicles according to the present invention.

FIG. 2 is a cut-away view of the present invention.

DESCRIPTION OF THE PREFERRED EMBODIMENT

Figure 3:
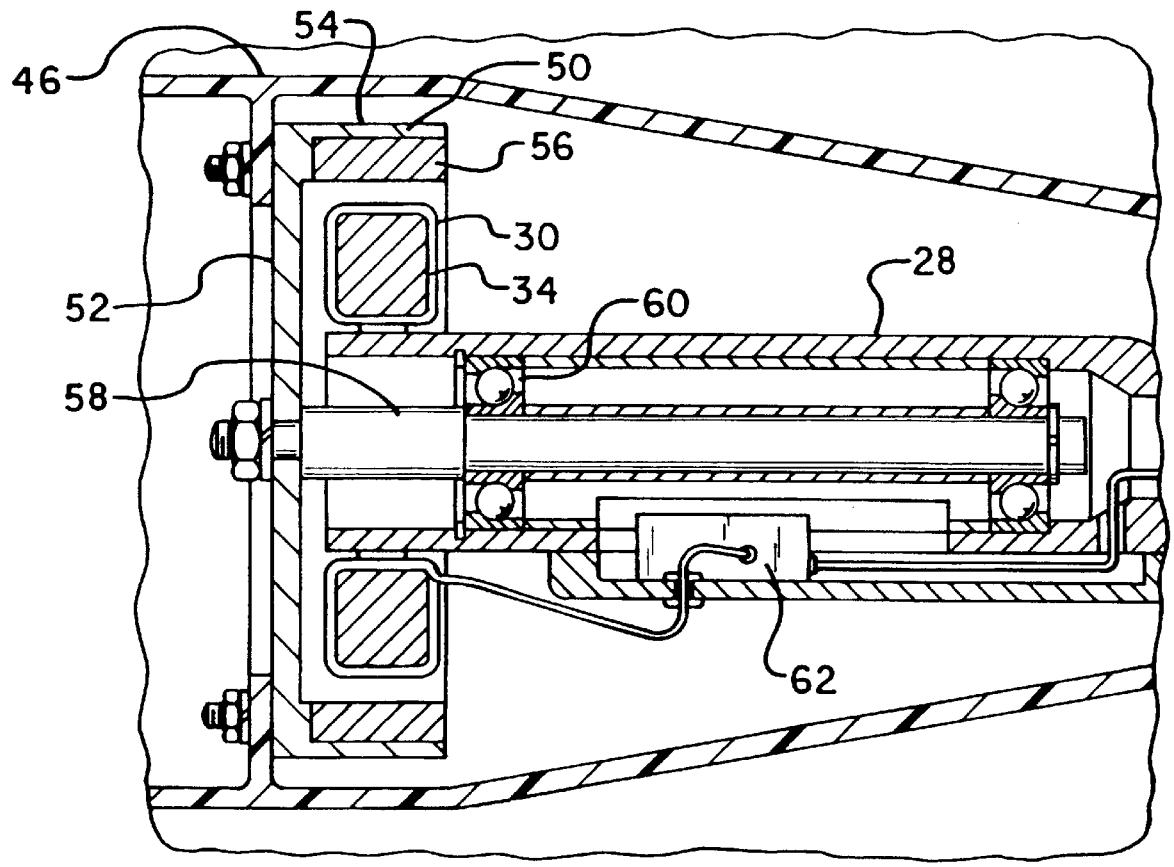
FIG. 3 is a cross-sectional view of the present invention taken along line 4—4 shown in FIG. 2.
Figure 4:
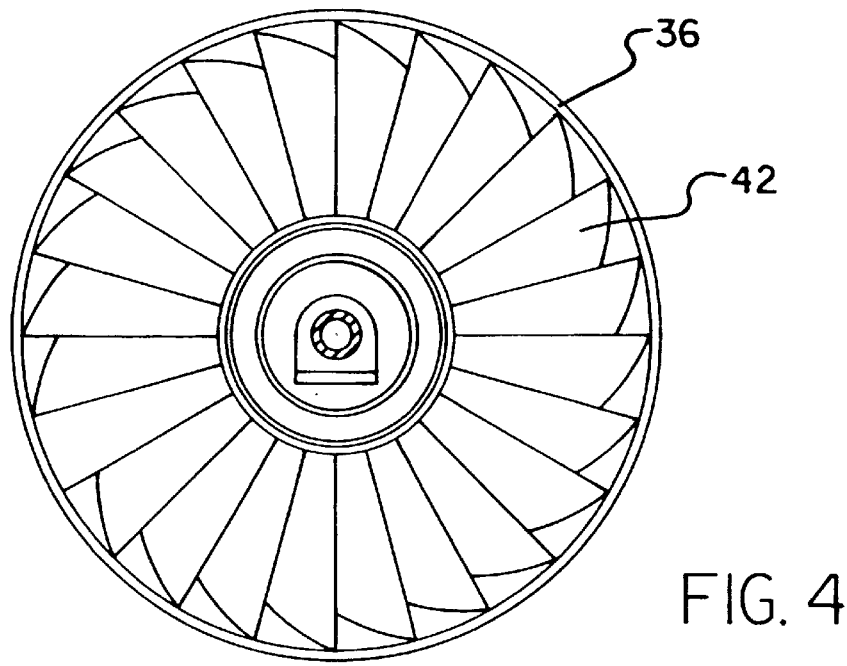
FIG. 4 is a front view of the turbine of the present invention.

With reference now to the drawings, and in particular to FIGS. 1 through 4 thereof, a new wind turbine generator for recreational vehicles embodying the principles and concepts of the present invention and generally designated by the reference numeral 10 will be described.

The system of present invention designated as numeral 10 includes a mounting assembly 12 including a hollow vertical linear rod 14 removably coupled to a ladder 16 of the recreational vehicle. Note FIG. 1. Such coupling is preferably accomplished by way of cross bars 18 which are permanently attached to the vertical rod.

At ends of each cross bar is a clamp 20 for releasably coupling with vertical members of the ladder thereby allowing the selective removal thereof. Preferably, the crossbars are telescoping in nature for accommodating ladders of various widths. In the alternative, the cross bars may be permanently coupled to the ladder with the vertical rod releasably coupled thereto.

The mounting assembly further includes an L-shaped rotator mount 22 with a vertical portion 24 having a bottom end rotatably coupled to the linear rod in collinear relationship therewith. The L-shaped rotator mount further includes a horizontal extent 26 extended above a roof of the recreational vehicle. The horizontal extent has a hollow cylindrical chamber 28 formed thereon in concentric relationship therewith. Note FIG. 3.

As shown in FIG. 2, a stator 30 is provided including a torroid 32 fixedly coupled about the end of hollow cylindrical chamber. A coil 34 is wrapped about the torroid.

Next provided is a turbine 36 including a frusto conical inner shell 38 and a frusto conical outer shell 40. A plurality of tapering turbine vanes 42 are coupled between inner surfaces of the shells. It should be noted that the number of vanes is preferably more than that shown in FIG. 4. Preferably, the outer shell comprises of two halves which are coupled by means of quarter turn fasteners 44. By this structure, a user may gain access between the vanes for removing any obstructions therein. The frusto conical inner shell is further equipped with an annular flange 46 integrally coupled to an inner surface thereof adjacent an end of the outer shell having a smaller diameter. As shown in both FIGS. 2 & 3, the annular flange extends radially inwardly within the interior surface of the inner shell.

With reference still to FIG. 3, a rotor 50 is shown to include a circular plate 52 fixedly coupled to the annular flange with a peripheral lip 54 integrally coupled to a periphery of the circular plate. The peripheral lip extends away from the end of the outer shell having a smaller diameter to define an open face and an interior space. The peripheral lip of the rotor has a plurality of magnets 56 coupled to an inner surface thereof. The rotor further has an axle 58 with a first end fixedly and coaxially coupled to the circular plate and a second end rotatably mounted within the hollow cylindrical chamber of the mounting assembly via a pair of bearing assemblies 60. As shown in FIG. 2, a majority of the length of the horizontal extent of the rotator mount resides within the inner shell of the turbine.

By this structure, the peripheral lip and associated magnets are rotatable about the stator for inducing a current within the coil upon the rotation thereof. Such rotation is effected by the flow of wind through the turbine. The rotation afforded by the rotator mount of the mounting assembly allows the turbine to align itself with the direction of the wind thereby affording optimal efficiency. Preferably, the stator and rotor define a 300 Watt alternator.

Mounted within the hollow cylindrical chamber of the mounting assembly is a regulator 62. Such regulator is connected to the coil for transmitting power received from the coil and further limiting the same during use.

A wire 64 is provided having a first end connected to the regulator and a second end strung through the mounting assembly. As shown in FIG. 1, the wire terminates in a plug for coupling with the recreational vehicle to recharge batteries situated therein. As such, the batteries may be continuously charged while the recreational vehicle is stationary.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wind powered electrical generator for a recreational vehicle comprising, in combination:

a recreational vehicle;

a mounting assembly including a hollow vertical linear rod removably coupled to a ladder of the recreational vehicle, the mounting assembly further including an L-shaped rotator mount with a vertical portion having a bottom end rotatably coupled to the linear rod in collinear relationship therewith and a horizontal extent extending above a roof of the recreational vehicle and having a hollow cylindrical chamber formed thereon in concentric relationship therewith;

a stator including a torroid fixedly coupled about the end of the hollow cylindrical chamber with a coil wrapped about the torroid;

a turbine including a frusto conical inner shell, a frusto conical outer shell, and a plurality of turbine vanes coupled therebetween, the frusto conical inner shell having an annular flange integrally coupled to an inner surface thereof adjacent an end of the outer shell having a smaller diameter and extending radially inwardly therefrom;

a rotor including a circular plate fixedly coupled to the annular flange with a peripheral lip integrally coupled to a periphery of the circular plate and extending away from the end of the outer shell having a smaller diameter, the peripheral lip of the rotor having a plurality of magnets formed therein, the rotor further having an axle with a first end fixedly and coaxially coupled to the circular plate and a second end rotatably mounted within the hollow cylindrical chamber of the mounting assembly via a pair of bearing assemblies with the peripheral lip and associated magnets thereof rotatable about the stator for inducing a current within the coil upon the rotation thereof;

a regulator mounted within the hollow cylindrical chamber of the mounting assembly and connected to the coil for transmitting power received from the coil and further limiting said power; and a wire having a first end connected to the regulator and a second end strung through the mounting assembly and terminating in a plug for coupling with the recreational vehicle for recharging batteries thereof.

2. A wind powered electrical generator for a recreational vehicle comprising, in combination:

a recreational vehicle;

a mounting assembly including a vertical rod removably coupled to the recreational vehicle;

a stator including a torroid fixedly coupled at a top end of the vertical rod with a coil wrapped about the torroid;

a turbine including a frusto conical inner shell, a frusto conical outer shell, and a plurality of turbine vanes coupled there between;

a rotor having a plurality of magnets fixedly coupled to the turbine and rotatably coupled to the stator for inducing a current within the coil upon the rotation thereof; and a wire having a first end connected to the coil and a second end strung through the mounting assembly and terminating in a plug for coupling with the recreational vehicle for recharging batteries thereof.

3. A wind powered electrical generator as set forth in claim 2 wherein further included is a regulator connected to the coil for transmitting power received from the coil and further limiting said power.

4. A wind powered electrical generator as set forth in claim 2 wherein the mounting assembly further includes an L-shaped rotator mount with a vertical portion having a bottom end rotatably coupled to the linear rod in collinear relationship therewith and a horizontal extent extending above a roof of the recreational vehicle and having the stator coupled thereto.

5. A wind powered electrical generator as set forth in claim 2 wherein the rotor has a circular plate fixedly coupled to an annular flange of the inner shell of the turbine, the circular plate equipped with a peripheral lip integrally coupled to a periphery thereof, the peripheral lip of the rotor having the magnets coupled thereto, the rotor further having an axle with a first end fixedly and coaxially coupled to the circular plate and a second end rotatably mounted the mounting assembly via a pair of bearing assemblies.

6. A wind powered electrical generator as set forth in claim 2 wherein the wire is strung through the vertical rod of the mounting assembly.

\* \* \* \* \*